(12) United States Patent
Balleisen

(10) Patent No.: US 7,873,484 B2
(45) Date of Patent: Jan. 18, 2011

(54) METHOD FOR RELIABLE POSITION MONITORING

(75) Inventor: Andreas Balleisen, Tittmoning (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 815 days.

(21) Appl. No.: 11/658,241

(22) PCT Filed: Jun. 17, 2005

(86) PCT No.: PCT/EP2005/006502

§ 371 (c)(1),
(2), (4) Date: Jan. 22, 2007

(87) PCT Pub. No.: WO2006/015651

PCT Pub. Date: Feb. 16, 2006

(65) Prior Publication Data

US 2008/0319705 A1     Dec. 25, 2008

(30) Foreign Application Priority Data

Aug. 6, 2004 (DE) .................. 10 2004 038 275

(51) Int. Cl.
*G06F 11/30* (2006.01)
(52) U.S. Cl. .................. 702/35; 702/94; 702/183
(58) Field of Classification Search ............... 702/33, 702/35, 94, 95, 151
See application file for complete search history.

(56) References Cited

U.S. PATENT DOCUMENTS

| | | | | |
|---|---|---|---|---|
| 4,115,958 | A | * | 9/1978 | Englander et al. ............. 451/49 |
| 4,484,137 | A | * | 11/1984 | Chang ........................ 324/166 |
| 5,201,380 | A | | 4/1993 | Callahan |
| 5,239,479 | A | * | 8/1993 | Nolting et al. .............. 700/174 |
| 5,313,346 | A | * | 5/1994 | Shimotashiro et al. ... 360/77.13 |
| 5,979,248 | A | * | 11/1999 | Gloger ..................... 73/862.28 |

(Continued)

FOREIGN PATENT DOCUMENTS

DE         102 00 436         7/2003

(Continued)

OTHER PUBLICATIONS

International Search Report, PCT International Patent Application No. PCT/EP2005/006502, dated Oct. 4, 2005.

(Continued)

*Primary Examiner*—Jeffrey R West
(74) *Attorney, Agent, or Firm*—Kenyon & Kenyon LLP

(57) ABSTRACT

A method for reliable position monitoring includes: (a) transmitting two measured position values from a position measuring device to a first processing unit; (b) transmitting a setpoint value from a setpoint value generator to a second processing unit; (c) transmitting one of the two measured position values to the second processing unit; (d) transmitting the setpoint value to the first processing unit; (e) performing mutually independent comparisons between the setpoint value and the measured position values by the first processing unit and the second processing unit; and (f) monitoring the measured position values for an electronic shaft break between the position measuring device and the first processing unit. The position values are different and have a defined relationship with respect to each other, and the transmitting (a) includes alternately transmitting the two measured position values to the first processing unit.

6 Claims, 1 Drawing Sheet

U.S. PATENT DOCUMENTS

| | | | | |
|---|---|---|---|---|
| 6,029,118 | A | * | 2/2000 | Strasser .................. 702/94 |
| 6,592,412 | B1 | * | 7/2003 | Geil et al. ................. 440/6 |
| 6,829,557 | B2 | * | 12/2004 | Hausschmid et al. ........ 702/150 |
| 6,912,444 | B2 | | 6/2005 | Pohl et al. |
| 2003/0018398 | A1 | * | 1/2003 | Juntunen et al. ............ 700/24 |
| 2003/0130816 | A1 | * | 7/2003 | Pohl et al. ................ 702/150 |
| 2003/0169003 | A1 | * | 9/2003 | Cao et al. ................. 318/432 |
| 2004/0107026 | A1 | | 6/2004 | Kroth |

FOREIGN PATENT DOCUMENTS

| | | |
|---|---|---|
| EP | 0 658 832 | 6/1995 |
| EP | 658832 A2 * | 6/1995 |
| WO | WO 03/003131 | 1/2003 |

OTHER PUBLICATIONS

International Preliminary Report on Patentability, PCT International Patent Application No. PCT/EP2005/006502, dated Aug. 11, 2006 (translation provided).

* cited by examiner

METHOD FOR RELIABLE POSITION MONITORING

FIELD OF THE INVENTION

The present invention relates to a method for reliable position monitoring. Such methods are important in connection with numerically controlled machine tools, for example.

BACKGROUND INFORMATION

In the area of numerically controlled machine tools, but also more generally in the area of automation technology, the topic of reliability plays an increasingly important role. The continuously progressing replacement of purely mechanical reliability devices such as, e.g., end switches with program-monitored reliability concepts increases the demands on the reliability of position detection and monitoring. Thus, it is demanded that a single fault (sensor failure, cable rupture, etc.) at least must not result in faulty position detection that is not recognized as such. If a faulty position detection is recognized, then at least it is possible to achieve a safe state via an appropriate reaction, e.g., via an emergency stop.

In order to achieve this, a two-channel detection of the position values using different position measuring devices is customary, the detected position values being compared to each other. This comparison is also performed in two channels. This is achieved in that two processors exchange and compare their position values respectively obtained from a position measuring device. Even if only one of the two processors detects a deviation, a safe state is established, for example, by forcing all spindles in a machine tool to a standstill.

A complete two-channel system, however, is relatively costly. For this reason, a device is described in German Published Patent Application No. 102 00 436, which makes it possible to implement reliable position monitoring on the basis of the output signals of a single position measuring device. The device makes use of the fact that in a position measuring device it is possible to form different signals representing the position value, which can be checked for consistency and which satisfy the demands on a reliable position detection. Thus, by monitoring the amplitude of periodic output signals, it is possible to ensure that the respectively detected position value is correct, or faulty signals may be recognized as such and suitable measures introduced. Data formed in different manners from the signals of the position measuring device supply position values that are derived independently of each other, which may then again be compared to each other in two channels.

It is also conventional in numerically controlled machine tools to perform lag error monitoring in the course of controlling the spindles of the machine tool. For this purpose, the setpoint input (e.g., position or speed of a spindle) is compared to the current actual value. If the deviation is too great, then the machining of the workpiece is interrupted or at least an alarm is output, since it is no longer guaranteed that the machined workpiece corresponds to the specifications. Such lag error monitoring, however, is not suitable for reliably monitoring a numerically controlled machine tool.

SUMMARY

Example embodiments of the present invention provide an improved method for reliable position monitoring.

For the provided method for reliable position monitoring, at least one position measuring device as well as a numerical control having a first processing unit, a second processing unit and a setpoint value generator may be utilized. The position measuring device transmits at least one measured position value to the first processing unit. The setpoint value generator transmits a setpoint value to the second processing unit. The at least one measured position value is also transmitted to the second processing unit. The setpoint value is also transmitted to the first processing unit, and, in the first and second processing units, mutually independent comparisons are performed between the setpoint value and the at least one measured position value.

In this manner, it is possible to perform a two-channel comparison between the setpoint value and the actual value. If the deviation between the two values it too great, a safe state may be established.

For example, it is possible to perform reliable position monitoring using only one single, simple position measuring device. For this purpose, at standstill a protection is introduced against a shaft break.

A mechanical shaft break exists if the mechanical connection between an object to be monitored and the monitoring position measuring system breaks off. The object moves, but the movement is no longer transmitted to the position measuring system. That is, the control system no longer registers a movement.

An electronic shaft break causes the measured position value transmitted to the control system to freeze. Depending on the position measuring system and the subsequent electronics, this may have varying causes, but it results in the control system receiving outdated position values and no longer detecting a movement of the monitored object.

Without appropriate measures, the control system is unable to distinguish a mechanical or an electronic shaft break from an actual standstill of the monitored object.

According to an example embodiment of the present invention, a method for reliable position monitoring includes: (a) transmitting two measured position values from a position measuring device to a first processing unit; (b) transmitting a setpoint value from a setpoint value generator to a second processing unit; (c) transmitting one of the two measured position values to the second processing unit; (d) transmitting the setpoint value to the first processing unit; (e) performing mutually independent comparisons between the setpoint value and the measured position values by the first processing unit and the second processing unit; and (f) monitoring the measured position values for an electronic shaft break between the position measuring device and the first processing unit. The position values are different and have a defined relationship with respect to each other, and the transmitting (a) includes alternately transmitting the two measured position values to the first processing unit.

Further features and aspects of example embodiments of the present invention are described in more detail below with reference to the appended Figures.

DETAILED DESCRIPTION

Figure 1:
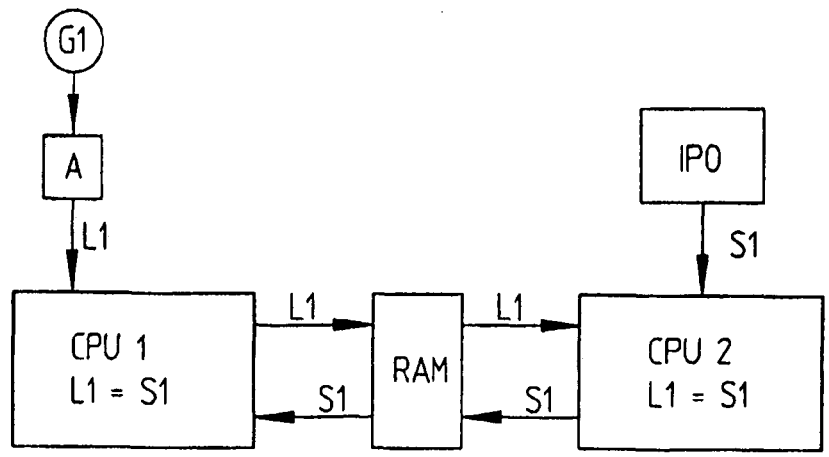
FIG. 1 schematically illustrates a setpoint value compared in two channels to a single position value.

According to a method for reliable position monitoring, as illustrated in FIG. 1, the signals of the single position measuring device G1 in an evaluation circuit A is processed into a position value L1 and is transmitted to a first processing unit CPU1. This first processing unit CPU1 is part of a numerical control.

A setpoint value generator IPO simultaneously transmits a setpoint S1 to a second processing unit CPU2, which is part of the numerical control. Setpoint value generator IPO may be, e.g., an interpolator of the numerical control, which is executed as software on second processing unit CPU2. First and second processing unit CPU1, CPU2 exchange position value L1 and setpoint value S1. This may be done, for example, via a jointly used RAM memory.

A two-channel comparison between setpoint value S1 and the actual value, that is, position value L1 is possible both in first processing unit CPU1 as well as in second processing unit CPU2. Even if just one of the two processing units CPU1, CPU2 detects a non-tolerable deviation, an alarm is emitted, which results in an appropriate reaction. This may be, for example, the shutdown of the machine tool via a shutdown channel. This shutdown channel may be available redundantly, that is, separately for each processing unit CPU1, CPU2.

In a modification of the arrangement illustrated in FIG. 1, position measuring device G1 and/or interpolator IPO may also send the respective comparison value L1 or S1 to both processing units CPU1, CPU2. An exchange of the two values would thus be unnecessary. This possibly results in a higher expenditure, however, due to additionally required lines.

Figure 2:
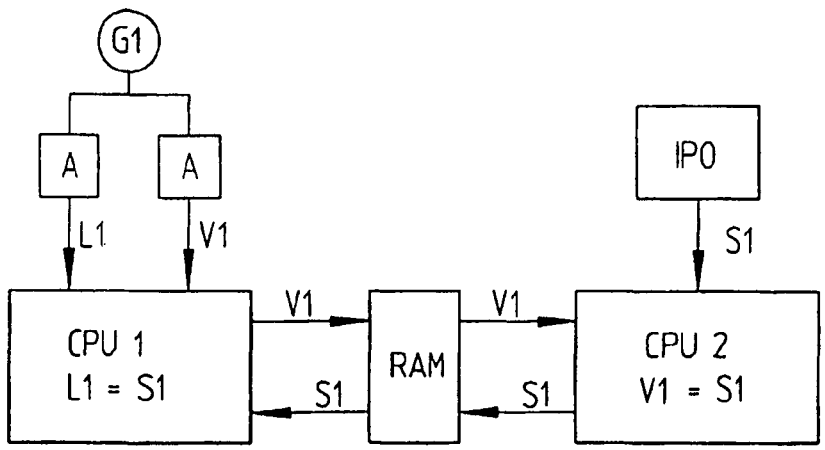
FIG. 2 schematically illustrates a setpoint value compared to two position values derived from one position measuring device.

FIG. 2 illustrates a variant of the method for reliable position monitoring. Two position values L1, V1 are produced from different, mutually independent signals of the single position measuring device G1. This may also be done in two evaluation circuits A mutually independently or even in a single evaluation circuit A such that the two position values L1, V1 have a certain independence from each other. For a position measuring device G1, which outputs both digital as well as analog position-dependent signals, this may be done by processing the digital output signals to form first position value L1 and processing the analog output signals to form second position value V1.

The two position values L1, V1 are transmitted to first processing unit CPU1. One of the two position values, position value V1 in the example, is transmitted to second processing unit CPU2, while setpoint value S1 is transmitted from second processing unit CPU2 to first processing unit CPU1. Again, a two-channel comparison (here: L1 with S1 and V1 with S1) and a corresponding reaction to deviations are possible.

In a modification of this method, it is also possible to transmit second position value V1 directly to second processing unit CPU2 and/or to transmit setpoint value S1 directly to both processing units CPU1, CPU2. Due to the higher cabling expenditure, however, the variant illustrated in FIG. 2 is considered to be preferred.

Figure 3:
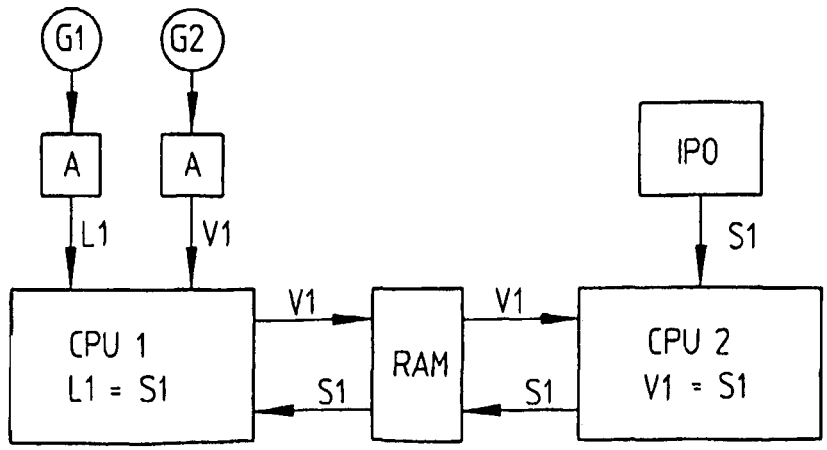
FIG. 3 schematically illustrates a setpoint value compared to two position values detected independently of each other by two position measuring devices.

A variant of the method is illustrated in FIG. 3. Two position measuring devices G1, G2 produce two position values L1, V1 that are completely independent of each other.

Otherwise, the method for processing these two position values is exactly the same as described in the example illustrated in FIG. 2.

In order to increase the reliability further, it may be provided when transmitting the various data L1, V1, S1 to use control values such as, e.g., CRC codes for providing the correct data transmission, or a statement of origin of the respective data (address of the position measuring device or of evaluation circuit A, where the position values originate). Thus, it is possible to verify at any time whether all values are transmitted correctly and originate from the right sources.

In addition, the shutdown channel of each processing unit CPU1, CPU2 may be protected such that it is activated even after a certain time of inactivity of the respective processing unit CPU1, CPU2. This may also be implemented by a separate watchdog circuit for each processing unit CPU1, CPU2.

In order to exclude the possibility that an electronic shaft break at a standstill is not recognized (since in that case changes occur neither in setpoint value S1 nor in measured position value L1, V1), the electronic shaft break may be monitored separately at least at a standstill. During movement (that is, at a variable setpoint value), an electronic (just as a mechanical) shaft break may be recognized immediately since the setpoint position and the actual position would no longer agree.

In the case of position values that are transmitted digitally to the control system, for monitoring for an electronic shaft break, there may be a provision that the position measuring system transmits a second, different position value in alternation with the actual position value. For this purpose, the first and the second position values stand in a defined relation to each other, it being possible, for example, for the second position value to have a certain offset with respect to the first position value. If the alternating transmission fails to occur, or if always the same value is transmitted, then the control system may infer an electronic shaft break. In this instance, the two position values transmitted for monitoring for an electronic shaft break may also be used as independent position values L1, V1 for the two-channel comparison to setpoint S1 in accordance with the second variant of the method described above.

Numerical control should be understood to include, e.g., such controls for machine tools. But it should also be understood to include every type of automated process control, which has two independent processing units CPU 1, CPU2 and is thus suited for implementing one of the described methods.

The reliability of position monitoring is increased even in the case when a position value L1 is recorded by only one single position measuring device G1. Even in this case, an additional reliability component may be introduced by the two-channel comparison to an expected value or setpoint value S1.

If more than one spindle is position-monitored, then one of the described methods is implemented separately for each spindle. Thus, for each spindle there is at least one position measuring device and thus at least one position value and one setpoint value.

What is claimed is:

1. A method for position monitoring, comprising:
    (a) transmitting two measured position values from a single position measuring device to a first processing unit;
    (b) transmitting a setpoint value from a setpoint value generator to a second processing unit;
    (c) transmitting one of the two measured position values to the second processing unit;
    (d) transmitting the setpoint value to the first processing unit;
    (e) performing mutually independent comparisons between the setpoint value and the measured position values by the first processing unit and the second processing unit;

(f) monitoring, at least during a standstill of a shaft of the single position-measuring device, the two measured position values for an electronic shaft break between the single position measuring device and the first processing unit;

wherein the two measured position values are different and have a defined relationship with respect to each other, the transmitting (a) including alternately transmitting the two measured position values to the first processing unit; and (g) determining an occurrence of an electronic shaft break based on a detection of a failure of the alternating transmission of the two measured position values.

2. The method according to claim 1, wherein the setpoint value is transmitted in the transmitting (d) from the second processing unit to the first processing unit, and the one of the two measured position values is transmitted in the transmitting (c) from the first processing unit to the second processing unit.

3. The method according to claim 2, further comprising exchanging the one of the two measured position values and the setpoint value between the first processing unit and the second processing unit via a shared memory area.

4. The method according to claim 1, wherein the determining (g) includes determining the occurrence of the electronic shaft break based on the detection of the failure of the alternating transmission of the two measured position values and based on a detection of a deviation of the two measured position values from a predefined offset with respect to each other.

5. The method according to claim 1, wherein at least one of (i) the transmitting (a) and (ii) the transmitting (b) includes transmitting CRC codes.

6. The method according to claim 1, wherein the first processing unit and the second processing unit form part of a machine-tool numerical control.

* * * * *